United States Patent [19]
Groitzsch et al.

[11] Patent Number: 5,158,636
[45] Date of Patent: Oct. 27, 1992

[54] METHOD FOR PREPARING A MICROPOROUS FILM

[75] Inventors: Dieter Groitzsch, Hirschberg, Fed. Rep. of Germany; Akinori Minami, Sowa, Japan; Gerhard Schaut, Hemsbach, Fed. Rep. of Germany

[73] Assignee: Firma Carl Freudenberg, Weinheim/Bergstr., Fed. Rep. of Germany

[21] Appl. No.: 316,005

[22] Filed: Feb. 27, 1989

[30] Foreign Application Priority Data

Mar. 30, 1988 [DE] Fed. Rep. of Germany ....... 3810757

[51] Int. Cl.$^5$ ................................................ C08J 9/00
[52] U.S. Cl. ...................................... 156/230; 156/77; 156/246; 264/41; 521/63; 521/64
[58] Field of Search ............... 156/246, 230, 231, 241, 156/249, 77, 78; 264/49, 42, 41, 233, 236, 344, 216, 212, 213, 300; 521/63, 64

[56] References Cited

U.S. PATENT DOCUMENTS

| | | | |
|---|---|---|---|
| 4,024,090 | 5/1977 | von Bonin et al. | 264/300 |
| 4,033,912 | 7/1977 | Kleimann et al. | 264/300 |
| 4,137,360 | 1/1979 | Reischl | 264/41 |
| 4,466,931 | 8/1984 | Tanny | 264/236 |
| 4,499,211 | 2/1985 | Walch et al. | 264/41 |

FOREIGN PATENT DOCUMENTS

| | | |
|---|---|---|
| 719272 | 1/1969 | Belgium . |
| 1694059 | 2/1974 | Fed. Rep. of Germany . |

OTHER PUBLICATIONS

Melliand Textilberichte 11 (1986), pp. 824 to 829.

*Primary Examiner*—David A. Simmons
*Assistant Examiner*—James J. Engel, Jr.
*Attorney, Agent, or Firm*—Felfe & Lynch

[57] ABSTRACT

A microporous, polymeric film is prepared by dissolving methylene-chloride-soluble, film-forming polymers completely in methylene chloride. Then an aqueous phase is prepared containing non-methylene-chloride-soluble, water-soluble thickeners and, if desired, additives, and brought to a viscosity of about 0.07 to 0.5 Pa s. The aqueous phase is then dispersed in the polymer solution and the resultant paste is spread onto a support material or intermediate support, the methylene chloride is evaporated, the resultant membrane is transferred to the actual support, and finally the water is removed by drying.

20 Claims, 2 Drawing Sheets

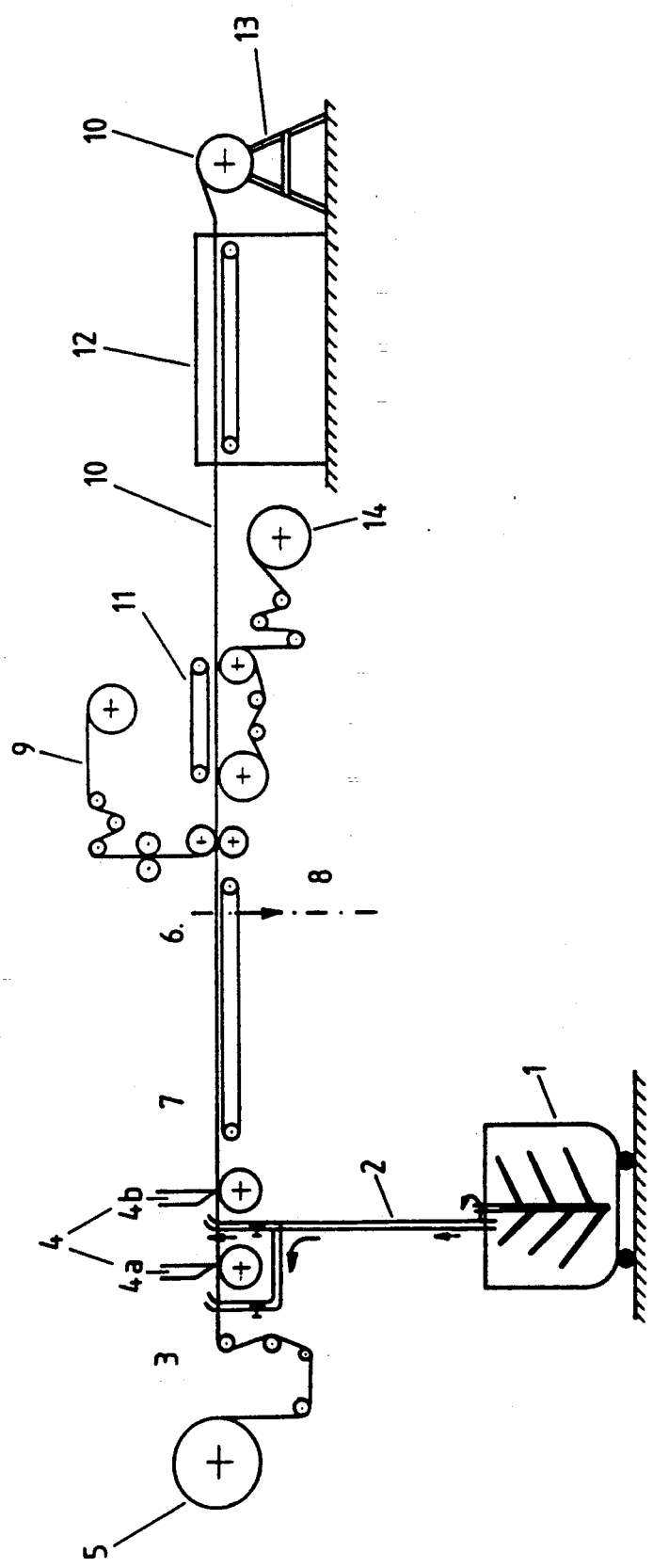

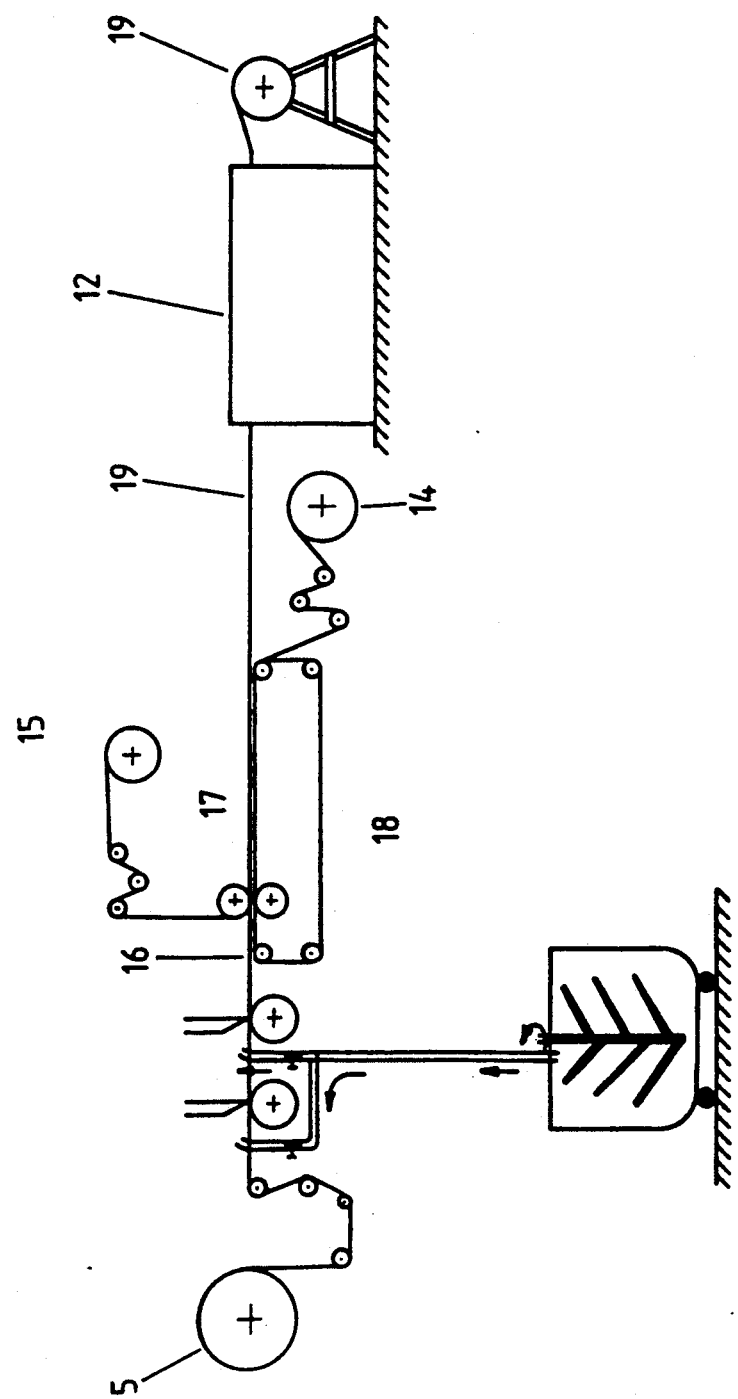

METHOD FOR PREPARING A MICROPOROUS FILM

BACKGROUND OF THE INVENTION

The present invention is in a method for producing a microporous, membrane-like polymeric film on a support material by forming a gel from an emulsion of a water and a polymer solution, and successively volatizing solvent and water after application to a sheet support. Such films are suitable for use as membranes for separating processes for the production and recovery of raw materials in the chemical, pharmaceutical, dairy and food industries. For example, supported membranes are used for the production of salt and drinking water (sea water desalting) by electrodialysis.

In the field of trauma therapy, for example, membranes of polyurethane or polytetrafluorethylene applied to a foam are used as a temporary skin replacement. The membrane keeps the wound moist, prevents the entry of bacteria, but allows oxygen necessary for the healing process to penetrate it.

Extremely moisture-repellent covers made of microporous films which are completely water-tight but nevertheless remain permeable to water vapor, are used on articles of clothing and in shoes, as well as in medical fabrics, operating-room covers and in clothing used in the area of an operation.

These films are manufactured chiefly by two different methods:

1. Formation of a polymer film by extrusion, by drying a polymer solution, or by polymerization in solution.

In the condensation or addition polymerization of polyurethane, for example, the starting components are dissolved in a solvent which can dissolve those components but not the end product. Thus, in Belgian Patent 719,272 the polyurethane becomes increasingly less soluble as additional polymerization progresses, until it finally precipitates.

In U.S. Pat. No. 4,466,931 a method is described which operates on a similar membrane-forming principle. A monomer or oligomer solution is photopolymerized, thereby spontaneously exceeding its solubility, and precipitates as a microporous film.

2. Formation of a gel layer by a sol-to-gel transition, following by drying.

The second principle includes all processes in which the polymer, after being applied, is coagulated out in a bath of precipitating agent or by applying a vapor of precipitating agent. It is necessary, then, that the precipitating agent be soluble in the polymer solvent.

The most widely used method is the coagulation of polyurethane, dissolved in dimethylformamide, by water. Disadvantages of that technique are that the coagulation process is slow and the washing out of the solvent and its regeneration are very complex.

Also state of the art is evaporative coagulation, which also involves the formation of a gel. The polymer solution consists of a good solvent and a poor solvent for the polymer. The poor solvent serves as a swelling or precipitating agent for the polymer. The good solvent must be more volatile than the precipitating agent. During the drying process the more volatile solvent evaporates first, and the swelling or precipitating agent becomes increasingly concentrated. Finally, after a critical concentration is reached, precipitation of the polymer occurs, i.e., the formation of the membrane structure. This process is described, for example, in DE-PS 16 94 059. A special case of such evaporative coagulation is the process described in Melliand Textilberichte 11 (1986), 824 to 829, where a hydrophobic polyurethane is dissolved in methyl ethyl ketone, some toluene is added as the swelling or precipitating agent, and water containing a hydrophilic polyurethane emulsifier is emulsified in this solution by means of a mixer or homogenizer.

Water is soluble 30 parts in 100 parts of methyl ethyl ketone of 20° C. Thus not only the toluene but also the water act as diluents. A water-in-oil emulsion is formed. As the temperature is raised step-wise, first the methyl ethyl ketone is evaporated, then the toluene, and finally the water.

The above-listed processes have severe disadvantages. To assure a selective evaporation of the more volatile solvent, the evaporation must be performed at relatively low temperature, i.e., relatively slowly. The main reason for this is that the boiling points of the organic solvent, the organic nonsolvent ("poor" solvent) and of the water are relatively close. Another disadvantage is that the solvent and precipitating agent are soluble in one another to a degree, and separation for their recovery is very complicated and difficult, so that in practice they are simply disposed of by burning. Since very dilute solvent solutions are used, large amounts of solvent are involved, which increases the cost of the process for lack of an economical method of recovery.

It is therefore an object of the present invention to provide a method for the production of a microporous, membrane-like polymer film or coating which utilizes the formation of a gel from an emulsion of water and polymer solution, and in which the solvent and water are successively evaporated after application, either by a direct method or by the transfer method, to a support material.

Another object of the invention is to avoid the above-described disadvantages, especially the need for a large amount of solvent, the lengthy processing time, and the problems of disposal and recovery of the solvent as well as the use of precipitating or swelling agents.

SUMMARY OF THE INVENTION

The above-described objectives and others are obtained by the method of the invention wherein, without the use of precipitating or swelling agent, an aqueous phase having a Brookfield viscosity of 0.07 to 0.5 Pa·s and treated with 0.3 to 6 wt. % of a known thickening agent, the thickening agent being soluble in water but not in methylene chloride, is emulsified in a 5 to 15% methylene chloride solution of at least one film-forming, thermoplastic polymer soluble in methylene chloride, the weight-ratio of polymer solution to aqueous phase amounting to 90:10 to 60:40 and the viscosity of the emulsion to 0.1 to 1.0 Pa·s. The resultant emulsion is spread onto a support material, the methylene chloride is volatilized, and the water is removed.

Preferably, the emulsion is spread onto the release-paper side of a transfer printing intermediate support, after evaporation of the methylene chloride the release paper with the water-moist membrane is duplexed onto the adhesive side of a final support sheet, the laminate is sealed and dewatered under surface pressure at 100° to 180° C., and the release paper is removed. Additional additives soluble in water but insoluble in methylene chloride, such as emulsifiers, pigments, crosslinking agents, and agents repellent to water, oil, dirt and alcohol and antimicrobially active agents can be admixed with the aqueous phase. Crosslinking aqueous polymer dispersions or water-soluble resins can be admixed in amounts of 0.01 to 10 wt. % with the aqueous phase.

The weight ratio of polymer solution to aqueous pore former is in the range of 90:10 to 60:40. The pore volume increases with increasing percentage of the water phase and ranges from 30 to 90% of the total volume of the membrane.

In the known methods of evaporation coagulation, the polymer is dissolved in a homogeneous mixture of two organic solvents. The polymer is very soluble in that of the two solvents with the higher vapor pressure (that is, in the component that evaporates first). On the other hand, it is not very soluble or has a low solubility in the second component. After the water is emulsified into the mixture in the well-known manner, the paste is brushed onto the substrate. As a result of the stepwise increase in the temperature of the drier, the polymer-dissolving solvent is selectively or almost completely evaporated first and the concentration of the nonsolvent or poor solvent for the polymer increases constantly, until finally the solubility product of the polymer is exceeded and the polymer coagulates out. At the next higher temperature step, the organic nonsolvent component finally evaporates. In the third temperature step, the water (pore forming agent) is evaporated.

In contrast to the known methods, the polymer is not dissolved in a mixture of at least two solvent components, i.e., a good solvent and a poor solvent, but only in a single solvent, namely in methylene chloride (dichloromethane). The dispersed water is absolutely insoluble in methylene chloride, and the method in accordance with the invention can surprisingly be performed without any nonsolvent and without precipitating agent. Consequently, in the true sense of the word, no evaporative coagulation is involved.

The boiling point of methylene chloride is $+39°$ C. Due to its high vapor pressure even at room temperature, methylene chloride can be volatilized rapidly without problems after the ready-mixed paste is applied to the support material, at air temperatures of $20°$ to $35°$ C., especially when the evaporating is accelerated by fanning with air.

The total insolubility between water and methylene chloride, as well as their widely separated boiling points, $98°$ C. and $39°$ C., respectively, thus permits a completely selective evaporation of the methylene chloride. Furthermore, it also greatly simplifies the regeneration of the solvent. It will be expedient to bind the methylene chloride by adsorbing it onto active carbon and then driving it off again with steam. After the condensation, two phases are formed from which the pure methylene chloride can be separated. The separated methylene chloride can then be fed directly back into the process for dissolving the polymer. Residual water causes no trouble, since an aqueous phase will be dispersed into the solution in the course of the process of the invention.

In accordance with the invention, a plurality of polymers can also be dissolved in methylene chloride. There is no harm if the polymers tend to form a coacervate. The hardness values of the membrane can be influenced, for example, by polymer mixtures. The preliminary experiments and knowledge required for this are familiar to the person skilled in the art.

The viscosity of the polymer solution must be in the range from 0.1 to 1.0 Pa·s. It constitutes the phase that forms the membrane structure. If the viscosity of the polymer solution exceeds about 1 Pa s, a brushable water-in-oil emulsion that is easily handled is not obtained. At viscosities below 0.1 Pa·s, larger amounts of methylene chloride must be evaporated making the economics less favorable.

The aqueous phase contained in the emulsion, with the adjuvants dissolved or finely dispersed therein, forms the pore structure upon drying.

The pore size depends on the degree of dispersion of the emulsion, i.e., the more finely the aqueous phase is distributed in the methylene chloride solution, the smaller the pores will be. The pore volume is codetermined by the volumetric ratio of the organic solvent phase to the water phase, the duplexing conditions in the case of transfer from a primary to a secondary support (pressure, temperature) and the Shore hardness or ball-impression hardness of the polymer being worked. The controlling of these factors is known by the practitioner devoted to this general field of activity. Increasing the percentage of the water phase increases the pore volume.

The evaporation of the methylene chloride concentrates the polymer and finally coagulates it. This takes place very rapidly due to methylene chloride's high volatility, even at room temperature. A stable emulsion of a water-in-polymer solution is formed, which is referred to also hereinafter as a "paste".

The viscosity of the aqueous phase is adjusted to 0.07 to 0.5 Pa·s with thickening agents known in themselves, in amounts between 0.3 and 6% of the weight of the aqueous phase. The thickening agents must be soluble in water only, but not in methylene chloride. Desirable thickening agents have proven to be anionic polyelectrolytes with neutralized carboxyl groups from the series of the acrylic acid homopolymers and/or copolymers, or nonionic thickeners such as water-soluble polymers with free hydroxyl groups, such as polyvinyl alcohols and cellulose derivatives.

The choice of the thickening agent or of the combination of thickeners depends essentially on whether a hydrophilic or hydrophobic membrane is to be produced. In the case of water-tight poromer coatings with a high permeability to water vapor, a hydrophobic membrane is necessary. The skilled practitioner knows how to use in such cases either very little thickener or those types which can be crosslinked cold or hot thus losing their hydrophilic character.

In the event a water-tight microporomer coating is desired, a low body thickener, that is, a thickener with a very high molecular weight is preferably used, since the amounts used are very low in this case. Inorganic, thixotropic, water-insoluble, silicate-based thickeners for example silicic acid containing more than 99.8 percent $SiO_2$, or combinations of same with organic thickeners have proven to be particularly advantageous.

In the case of hydrophilic coatings, the use of low molecular weight organic thickeners in appropriately higher amounts is more advantageous.

The method of the invention is also suitable for the transfer-printing technique, in which the emulsion is spread on the separating-paper side of a temporary transfer-printing support, the methylene chloride is evaporated and the release paper with the water-wet membrane is duplexed onto the adhesive-coated side of a final support. The laminate is then sealed and dewatered under contact pressure at 100° to 180° C., and finally the release paper is removed. A detailed description of this process is given in the examples.

All film-forming, thermoplastic polymers which are soluble in methylene chloride are suitable for the invention:

Thermoplastic hard polymers with a ball-impression hardness of 80 to 200 N/mm$^2$, such as polystyrene, polycarbonate, cellulose acetate, copolyesters of hydroxybutyric acid and hydroxyvaleric acid, polysulfones, polymethacrylates, polyether sulfones, polyether imides, polyphenylene oxides, copolymers of acrylic ester, styrene and acrylonitrile (ASA) as well as copolymers of vinyl chloride/vinyl acetate, vinyl chloride/acrylate, or vinyl chloride/acrylate/vinylbutyl ether, are suitable if the support material onto which the membrane is to be transferred, is still and inflexible.

For flexible, soft and cloth-like supports, however, softer polymers are suitable with a hardness of 25 to 70 Shore D. Thermoplastic elastomers with a segmented structure, provided always that they are soluble in dichloromethane are advantageous for that application. Especially suitable are copolyester elastomers made up of hard polyester segments (e.g., polybutylene terephthalate) and soft polyester segments (e.g., polytetramethylene ethers). Also suitable are polycarbonate-polysiloxane block co-condensates or styrene-butadiene-styrene copolymers. Organopolysiloxane-polycarbonate block copolymers are elastic, have high tensile strength, are resistant to hydrolysis and are good electrical insulators. These block copolymers are formed from the reaction of hydroxyalkylene-terminated polydimethylsiloxanes, 2,2-bis-(4-hydroxyvinyl)-propane and phosgene in dichloromethane as solvent. They are described in U.S. Pat. Nos. 3,189,662 and 3,419,634 as being soluble in methylene chloride.

Linear polyurethanes and polyurethane ureas which are composed of aromatic or aliphatic diisocyanates and aliphatic or aromatic polycarbonate diols or polyester carbonate diols have also proven suitable for the application in accordance with the invention, examples being polyester-polycarbonate-polyurethanes, polycarbonate-polyurethanes, polyester-polycarbonate-polyurethane ureas or polycarbonate-polyurethane ureas. In the selection of suitable polyurethanes, however, special heed must be given to solubility in methylene chloride, as well as the thermal stability of the porous film, which usually makes the use of this class of polymers somewhat less advantageous.

If required, the known additives, such as emulsifiers, pigments, crosslinking agents, water repellents, oil repellents or alcohol repellents and antimicrobial agents, for example, can be admixed with the aqueous phase.

Self-crosslinking polysiloxanes with SiH groups are suitable, for example, as water repellent agents.

Suitable crosslinking agents for the polymers contained in the pastes, and especially for the thickeners containing carboxyl or hydroxyl groups are, for example, melamine- and urea-formaldehyde resins, polyepoxides, polyaziridines and polycarbodiimides.

The frequent occurrence in the previously known methods, of incompatibility and paste instability (the ingredients can get into the polymer solution), due to the partial solubility of water in the solvent, are unlikely to occur in the method of the invention due to the complete insolubility of water in methylene chloride. The formulation of the pastes is thus considerably simplified in practice.

The addition of aqueous polymer dispersions or water-soluble resins to the aqueous phase in amounts of 0.01 to 10 wt. % is advantageous especially when the polymer dissolved in methylene chloride itself has no crosslinkable groups in the polymer chain or at its terminations, as is the case, for example, with polyester elastomers. The membrane polymer matrix is in this case coated in the finished state with a crosslinked film of the aqueous polymer dispersion and determines the physical properties of the film. Uncrosslinked membrane-forming polymers of low thermal stability or those which are not resistant to chemical cleaning can be improved in these properties by the coating of crosslinked polymer.

The aqueous polymer dispersions preferably contain N-methylolacrylamide or etherified N-methylolacrylamide groups. It is well known that, catalyzed by acid or salt, these acrylamides are cross linked, splitting off formaldehyde. The reaction products of urea, urea derivatives such as ethyleneurea, propyleneurea, hydroxypropyleneurea, acetylenediurea, glyoxalurein, ethyltriazinone and melamine with formaldehyde, which are well known in textile finishing, are suitable as water-soluble condensates. Additional resin-forming and/or cross linking compounds, used in textile finishing, are listed in Textilveredlung 3 (1968), pages 452 and 453.

The paste is applied preferably with a tandem doctor blade. The two doctor blades are disposed so closely one behind the other, that a wet-in-wet application without intermediate drying can take place. With that, the formation of pinholes can be avoided.

In the case of continuous production it is necessary to compensate at least for the amount of the heat that is lost from the material through evaporation. This can be done with a warm current of air. To achieve high production rates, such as for example 20 to 30 meters per minute, it is desirable to raise the temperature of the air or of the gaseous medium containing air from the apparatus for the recovery of solvent to no more than 80° C.

The spreading paste in accordance with the invention is suitable for the direct and for the transfer coating method. After the conclusion of the emulsifying process, any air bubbles that might have been stirred in are removed from the paste, preferably by letting it stand. On account of the high specific weight of methylene chloride, of 1.336 g/cm$^3$, the air bubbles tend to rise. The withdrawal of the paste should therefore be made from the bottom, i.e., countercurrently to the air escaping from the paste.

To improve the resistance of the membrane made in accordance with the invention to the effects of solvents, for example, it may be desirable for the complete drying to be followed by a thermal crosslinking.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

BRIEF DESCRIPTION OF THE DRAWINGS

FIG. 1 schematically depicts a process of coating on release paper followed by transfer to a flexible support; and FIG. 2 schematically illustrates an additional transfer process.

DESCRIPTION OF PREFERRED EMBODIMENT

Referring to FIG. 1, a paste 2 is produced by adding an aqueous, thickened component to a methylene chloride solution of polymer, with stirring and homogenization in a conventional stirring or emulsifying and dispersing apparatus. The entire production of the paste is performed in a closed container 1.

The paste 2 is applied through a paste feed 3 to a surface of a release paper 5 by means of a tandem doctor system 4. In this manner a wet-in-wet application without intermediate drying is achieved and thus the formation of pinholes is prevented. The two doctor blades 4a and 4b are situated closely one behind the other.

After leaving the paste spreading system, the methylene chloride evaporates in the long run 7, assisted by fanning with air 6 of 20° to 60° C. The methylene chloride vapors are carried away through duct 8 and, after adsorption on active carbon and moisture extraction, the methylene chloride is recycled to the process for preparing the polymer solution. A complete solvent recycling is thus assured. The recovery of solvent can also be performed by condensing it out of the methylene chloride containing air stream.

When the coating leaves the evaporation zone 7, the methylene chloride has evaporated completely. The water of the water-in-oil emulsion paste remains in the coating as pore-forming liquid.

At this point, therefore, the membrane structure is already completely formed, without using a dryer.

The film is then transferred to a flexible textile support 9, which may be a nonwoven, a jersey, laid goods, or light woven fabric. In the use of the method of the invention, the membrane lying on the release paper can be transferred onto the support 9 in the wet state, i.e., before drying. Support 9 is printed on the membrane side with dots of an adhesive sealing composition or contains a layer of hot-sealing fibers. In the laminating machine, the sealing composition that is applied on one side of the nonwoven fabric, aided by the water content of the microporous coating, is caused to soften and the transfer from paper to support is thus made possible.

In the event that a cross linkable polymer matrix is used or in the presence of cross linkable resins or polymer latices in the aqueous phase, cross linking is carried out thermally after the drying.

The transfer of the wet membrane to the support takes place very rapidly, i.e., within a few seconds and takes place according to the state of the art.

The flexible laminate 10 consists of a support and porous membrane and leaves the laminating machine 11 while still wet and is subsequently dried in dryer 12. It may then be thermally crosslinked in some cases, and is wound on the winder 13. The release paper has already been separated on the winder 14 and is available for repeated use.

The membrane polymer has sufficient thermal stability to withstand the evaporation of the water without closing the pores by fusion or collapse. The drying air is heated at 100° to 180° C. to enable sufficient crosslinking or hardening of the membrane polymer or prepolymer and of the additives. It is desirable to apply lower temperatures at the beginning and higher temperatures at the end of the drying cycle.

The method of the invention is advantageous in its simplicity, its low production cost, and the possibility of recycling the solvent. Simple machines of reasonable cost can be used for the coating of the support. The needed evaporating power is very low, i.e., the dimensions of the dryer can be kept relatively small.

It is possible to replace the release paper with endless belts made, for example, of high-grade stainless stell or PTFE-coated, fine-woven fabric.

In an alternate embodiment of the invention shown in FIG. 2, the membrane, still containing methylene chloride, is transferred in the sol/gel state to an adhesive-free support. In this case, the support feed 15 and the duplexing take place at 16 in the methylene chloride evaporation zone 17, i.e., at a point where the membrane matrix is still in the tacky state. There the duplexing can be performed merely by pressing with a roller 18. After the complete evaporation of the methylene chloride the support is so tightly bonded to the membrane that there is no difficulty in separating the laminate 19 from the release paper or from the endless belt.

The coating produced in accordance with the invention can be made hydrophilic or hydrophobic. In the clothing and footwear industries and in the case of operating-room covers and smocks, only hydrophobic, microporous membranes are needed in order to hold back alcohol and water and permit water vapor to escape. Furthermore, such a hydrophobic film is suitable for rainwear, sport clothing, gloves and shoes.

The membrane is not, however, limited to applications in which water vapor permeability is required and water is to be blocked. By omitting hydrophobic or oleophobic additives which modify the surface tension of the membrane material, the latter can be adapted to the particular requirements, but the porous structure is retained in every case.

Examples will now be given of formulas of the present invention.

EXAMPLE 1

A) Preparation of Polymer Solution in Methylene Chloride

A common commercial polyester elastomer powder with a segmented polymer chain structure, consisting of polybutyleneterephthalate hard segments and polytetramethylene ether soft segments, with a Shore D hardness of 40, a specific weight of 1.16 g/cm$^3$ and a melting point of 168° C. is dissolved in dichloromethane. The solution, adjusted to 12 weight-percent, has a viscosity of 0.2 Pa·s, measured with the Brookfield rotating viscometer at 20 rpm with spindle No. 2.

B) Preparation of the Aqueous Phase

To 93 parts by weight of deionized water, 1.9 weight-parts of a 40% common commercial ionomer dispersion of aliphatic, crosslinking polyester urethane are added. The particle size of the dispersion amounts to 0.1 to 0.4 microns. After the addition of 2.0 weight-parts of a 25% polyacrylic acid dispersion for thickening and 4.0 weight parts of concentration ammonia, a Brookfield viscosity of 0.14 Pa·s is established, measured with spindle No. 4 at 20 rpm.

C) Preparation of the Paste 675 weight-parts of the 12% polymer solution A are placed in the reactor. With intensive stirring, 325 weight-parts of aqueous phase B are slowly added. A W/O emulsion forms having a viscosity of 5.5 Pa·s, measured with the Brookfield viscometer, spindle No.

4, at 20 rpm. The solid content of the water-in-oil emulsion spreading paste amounts to 8.51 weight-percent.

D) Coating

The spreading paste is applied to a waterproof, high-gloss release paper by means of a tandem doctor. The wet layer thickness (coating thickness) of the first doctor amounts to 100 microns and that of the second doctor 300 microns. By this method of application, coating flaws, especially so-called "pinholes", are avoided. After about 1 minute of fanning with air heated at 35° C. from a hot-air blower, about 99% of the methylene chloride evaporates.

E) Transfer to Textile Support

Immediately after the evaporation of the solvent the release paper is laid with the moist microporous coating on the adhesive side of a nonwoven fabric printed with copolyester paste. The microporous film is transferred to the flexible nonwoven fabric in a pressing machine heated at 110° C. and then the paper is separated. The press time is about 10 seconds. The weight of the spot-bonded nonwoven of polyamide and polyester fibers is 25 g/m² and that of the adhesive overlay 10 g/m². The softening range of the copolyester adhesive overlay is about 85° to 88° C.

After the removal of the reusable release paper the laminate of nonwoven, copolyester adhesive and microporous polyester-elastomer membrane is treated wet-in-wet with a 5%, non-ionogenized fluorocarbon resin emulsion. The wet pick up amounts to 50% with respect to the dry weight of the laminate. After the impregnation, drying is carried out for 4 minutes at 115° C. The total weight of the treated laminate is 56 g/m², of which 21 g/m² is the microporous coating of polyester elastomer. The average pore size, determined from a scanning electron micrograph, is in the range of 1 to 2 microns. The water-tightness measured according to DIN 53886 amounts to over 150 mbar. The water-tightness, measured in accordance with DIN 53,333 is very high, amounting to 23.1 mg/cm² per hour.

EXAMPLE 2

The preparation of the microporous coating on the release paper is performed like Example 1 up to step D. The moist membrane is dried in an air stream of 110° C. and then pulled from the release paper. The Hydrostatic Head measured according to DIN 53886, resp. IST 80.6-70 (R 82), resp. AATCC 127-1977 resp. FTMS 191 A Method 5514; amounts to over 150 mbar.

The thickness of the film is about 55 microns. The pore volume can be computed on the basis of the thickness, the film weight and the specific density of the polyester elastomer, by the following mathematical equations:

$$p_{Membrane} = \frac{FG}{D_{Membrane} \cdot 10^4} \quad (1)$$

$$V_{Pores} = \frac{V_{Membrane} - V_{Polymer}}{V_{Membrane}} \cdot 100 \quad (2)$$

For a weight per unit area of 1 m², V=D:

$$V_{Pores} = \frac{D_{Membrane} - D_{Polymer}}{D_{Membrane}} \cdot 100 \quad (3)$$

-continued $$D_{Polymer} = \frac{FG}{p_{Polymer} \cdot 10^4} \quad (4)$$

wherein:

$p_{Polymer}$ represents the specific density of the (compact) polymer in grams per cubic centimeter $p_{Membrane}$ represents specific density of the membrane in grams per cubic centimeter FG is the weight per unit area of the membrane in grams per square meter $V_{Pores}$ is the pore volume as a percentage of the total volume of the membrane $D_{Membrane}$ is the thickness of the membrane in centimeters $D_{Polymer}$ is the thickness of the compact plastic from formula (4) in centimeters.

By using $D_{Polymer}=1.16$ g/cm³ for the polyester elastomer, the measured thickness of the membrane 0.055 cm, and the measured weight per unit area of the membrane 21 g/m², the pore volume computed from Formula (3) is 67.27%. The water vapor permeability is 27 mg/cm² h.

EXAMPLE 3

A 12 wt. % solution of a common commercial polyether imide (ULTEM, a trademark of General Electric) in methylene chloride is prepared.

The spreading paste is prepared as in Example 1, part C, from 675 weight-parts of a 12% polymer solution and 325 weight-parts of the aqueous phase B from Example 1.

The resulting 8.51% spreading paste is applied to a waterproof release paper as in Example 1, part D, and the methylene chloride is evaporated. The support for the transfer of the polyether imide membrane was a 150 g/m² calendered, stiff nonwoven of 100% polyester fibers having on one side a coat of 16 g/m² of polyethylene vinyl acetate sealing powder.

Polyether imide is, in contrast to the polyester elastomer used in Examples 1 and 2, very hard and inelastic.

The wet membrane is laid on the sealed side of the nonwoven fabric and transferred to the fabric in an ironing press heated at 100° C. The release paper is then removed.

In the scanning electron microscope a very pronounced microporosity is observed and also the foam-like structure of the polyether imide, with a majority of pore diameters of 0.5 to 5 microns. The pore volume is here calculated at 65.3%. The water-vapor permeability is 25 mg/cm² h.

It will be understood that the specification and examples are illustrative but not limitative of the present invention and that other embodiments within the spirit and scope of the invention will suggest themselves to those skilled in the art.

We claim:

1. A method for the preparation of a microporous membrane-like, polymeric film comprising:
   forming an aqueous phase without use of a precipitating or swelling agent, the aqueous phase having a viscosity of 0.07 to 0.5 Pa·s as adjusted by being treated with 0.3 to 6 wt. % of a thickening agent soluble in water but not soluble in methylene chloride;
   emulsifying the aqueous phase in 5 to 15% methylene chloride solution of an at least one film forming thermoplastic polymer soluble in methylene chloride in a weight ration of polymer solution to aqueous phase of 90:10 to 60:40, the polymer solution having a viscosity of 0.1 to 1 Pa·s;

spreading the polymer solution onto a support material to coat the support;

volatizing the methylene chloride from the coated support; and removing water at a temperature of 100° to 180° C.

2. The method of claim 1 wherein the methylene chloride is volatized by treating the coated support with a gaseous medium which is at a temperature of 20 to 60° C.

3. The method of claim 1 wherein the emulsion is spread onto the support by means of a tandem doctor.

4. The method of claim 1 wherein the emulsion is spread onto a release-paper side of a transfer printing intermediate support, and after evaporation of the methylene chloride is transferred onto an adhesive side of a final support sheet.

5. The method of claim 4 further comprising that the laminate is sealed and dewatered under surface pressure at 100° to 180° C., and the release paper is removed.

6. The method of claim 1 wherein additional additives soluble in water but insoluble in methylene chloride are admixed with the aqueous phase.

7. The method of claim 6 wherein the additives include at least one of emulsifiers, pigments, crosslinking agents, and agents repellent to water, oil, dirt and alcohol and antimicrobially active agents.

8. The method of claim 1 wherein crosslinking aqueous polymer dispersions or water-soluble resins are admixed in amounts of 0.01 to 10 wt. % with the aqueous phase.

9. The method of claim 1 wherein the pore volume of the microporous film is from 30 to 90% of the total volume of the membrane.

10. The method of clam 1 further comprising recovering the volatized methylene chloride.

11. The method of claim 1 wherein the thermoplastic polymer is a hard polymer with a ball-compression hardness of 80 to 200 N/mm$^2$.

12. The method of claim 11 wherein the thermoplastic polymer is selected from the group consisting of polystyrene, polycarbonate, cellulose acetate, copolyesters of hydroxybutyric acid and hydroxyvaleric acid, polysulfones, polymethacrylates, polyether sulfones, polyether imides, polyphenylene oxides, copolymers f acrylic ester, styrene and acrylonitrile (ASA) as well as copolymers of vinyl chloride/vinyl acetate, vinyl chloride/acrylate, or vinyl chloride/acrylate/vinylbutyl ether.

13. The method of claim 1 wherein the thermoplastic polyester is a soft polymer with a hardener of 25 to 70 Shore D.

14. The method of claim 1 wherein the thermoplastic polymer is an elastomer with a segmented structure.

15. The method of claim 1 wherein an aqueous polymer dispersion is added to the aqueous phase in an amount of 0.01 to 10 wt. %.

16. The method of claim 1 wherein a water soluble resin in the amount of 0.01 to 10 wt. % is added to the aqueous phase.

17. The method of claim 15 wherein the dispersion contains N-methylolacrylamide or etherified N-methylolacrylamide groups.

18. The method of clam 1 wherein the thermoplastic polymer is a linear polyurethane.

19. The method of claim 1 wherein the thermoplastic polymer is a polyurethane resin.

20. The method of claim 1 wherein the thermoplastic polymer is selected form the group consisting of polyester-polycarbonate-polyurethanes, polycarbonate-polyurethanes, polyester-polycarbonate-polyurethane ureas or polycarbonate-polyurethane ureas.

* * * * *